US012450951B2

United States Patent
Zou et al.

(10) Patent No.: US 12,450,951 B2
(45) Date of Patent: Oct. 21, 2025

(54) DETECTION METHOD FOR LOW-QUALITY FAKE FACE IMAGES BASED ON DOMAIN-INVARIANT FEATURE LEARNING

(71) Applicant: Chongqing University of Technology, Chongqing (CN)

(72) Inventors: Yan Zou, Chongqing (CN); Jianxun Zhang, Chongqing (CN)

(73) Assignee: Chongqing University of Technology, Chongqing (CN)

( * ) Notice: Subject to any disclaimer, the term of this patent is extended or adjusted under 35 U.S.C. 154(b) by 0 days.

(21) Appl. No.: 18/764,066

(22) Filed: Jul. 3, 2024

(65) Prior Publication Data
US 2025/0014390 A1   Jan. 9, 2025

(30) Foreign Application Priority Data
Jul. 7, 2023   (CN) .......................... 202310831456.1

(51) Int. Cl.
G06V 40/40   (2022.01)
G06T 7/00   (2017.01)
G06V 10/44   (2022.01)
G06V 10/52   (2022.01)
G06V 10/771   (2022.01)

(52) U.S. Cl.
CPC ............ G06V 40/45 (2022.01); G06T 7/0002 (2013.01); G06V 10/44 (2022.01); G06V 10/52 (2022.01); G06V 10/771 (2022.01); G06T 2207/30168 (2013.01)

(58) Field of Classification Search
CPC ...... G06V 40/45; G06V 10/771; G06V 10/44; G06V 10/52; G06T 7/0002; G06T 2207/30168

USPC ......................................................... 382/118
See application file for complete search history.

(56) References Cited

FOREIGN PATENT DOCUMENTS

CN   115471736 A   12/2022

OTHER PUBLICATIONS

Hu, Ziheng, et al. "Dynamic-aware federated learning for face forgery video detection." ACM Transactions on Intelligent Systems and Technology (TIST) 13.4 (2022): 1-25. (Year: 2022).*
Qian, Yuyang, et al. "Thinking in frequency: Face forgery detection by mining frequency-aware clues." European conference on computer vision. Cham: Springer International Publishing, 2020. (Year: 2020).*

(Continued)

*Primary Examiner* — Jonathan S Lee (57) ABSTRACT

The present disclosure provides a detection method for low-quality fake face images based on domain-invariant feature learning, including the following steps: S1, inputting datasets into a residual network (ResNet)-50, and forward propagating low-quality compressed input images and original images corresponding thereto; S2, obtaining high-frequency information of two datasets of different resolutions; and using the high-frequency information to compensate for features discarded in the compression process; and S3, performing T-distributed stochastic neighbor embedding (T-SNE) operation on outputs from the ResNet-50 at a final stage to obtain feature distributions of a high-quality dataset and a low-quality dataset. Domain invariance is used for inscribing correct artificial artifact traces, alleviating the overfitting on low-quality compressed images.

6 Claims, 7 Drawing Sheets

(56) References Cited

OTHER PUBLICATIONS

Aghdaie, Poorya, et al. "Detection of morphed face images using discriminative wavelet sub-bands." 2021 IEEE International Workshop on Biometrics and Forensics (IWBF). IEEE, 2021. (Year: 2021).*

Liu, Honggu, et al. "Spatial-phase shallow learning: rethinking face forgery detection in frequency domain." Proceedings of the IEEE/CVF conference on computer vision and pattern recognition. 2021. (Year: 2021).*

Aghdaie, Poorya. Deep Face Morph Detection Based on Wavelet Decomposition. Diss. West Virginia University, 2023. (Year: 2023).*

Aghdaie, Poorya, et al. "Morph detection enhanced by structured group sparsity." Proceedings of the IEEE/CVF Winter Conference on Applications of Computer Vision. 2022. (Year: 2022).*

Liu, Jiawei, et al. "Adaptive texture and spectrum clue mining for generalizable face forgery detection." IEEE Transactions on Information Forensics and Security 19 (2023): 1922-1934. (Year: 2023).*

* cited by examiner

DETECTION METHOD FOR LOW-QUALITY FAKE FACE IMAGES BASED ON DOMAIN-INVARIANT FEATURE LEARNING

CROSS-REFERENCE TO RELATED APPLICATIONS

This application claims priority of Chinese Patent Application No. 202310831456.1, filed on Jul. 7, 2023, the entire contents of which are incorporated herein by reference.

TECHNICAL FIELD

The present disclosure relates to the technical field of fake face detection, and in particular to a detection method for low-quality fake face images based on domain-invariant feature learning.

BACKGROUND

Faces play an important role in our daily life, such as access control and face-scanning payment. However, in recent years, deep learning techniques have been misused to fake faces, leading to widespread fake images and videos on the Internet, represented by "Deepfakes". These deep faking techniques reduce or even distort the authenticity of the information online by tampering with or replacing the face information in original videos, which not only affects companies and celebrities, but also poses a huge threat to the life and work of ordinary people. Therefore, the development of effective detection methods is increasingly urgent.

Many methods have been proposed successively to solve such problems. The conventional methods mainly focus on designing non-learning algorithms to extract fake features, which can be categorized as color features, biological features, and other discriminative features, from images in order to discover the difference between real faces and tampered faces, and ultimately, transmitting the handcrafted features to a machine learning algorithm for classification. Although the conventional detection methods are very mature, they are limited to small and medium sized datasets. In today's era of big data explosion, the conventional methods lose its advantage of high efficiency, and with the development of deep faking techniques, fake faces are increasingly realistic, making the conventional methods based on specific artifacts risk an enormous challenge.

To capture subtler difference between real and fake images, the subsequent work has focused on using deep convolutional neural networks (CNNs) to learn discriminative features from training datasets for fake face detection. These methods use an off-the-shelf neural network backbone that takes facial images directly as inputs and then categorizes them as real or fake. However, these CNNs tend to look for fake traces within a limited facial region and lack a comprehensive understanding of artifacts. Since then, the mainstream of research has gradually shifted towards improving face fake detection based on specific priori knowledge by optimizing the network structure or designing corresponding end-to-end learning frameworks. Despite the good results from recent work, low-quality datasets can easily lead to the failure of the existing methods. This is due to the fact that: a) the existing methods always depend on fake modes possessed by a certain manipulation technique presented in the training dataset, but low-quality images blur these artifact traces; and b) the compression of the image introduces a lot of extraneous noise information that is not noticed by the current methods. Therefore, in the real world, since fake face images shared on social media are usually compressed, the existing methods suffer significant performance degradation on low-quality compressed face images and usually fail to achieve the desired results.

SUMMARY

Aiming to at least solving the technical problems existing in the prior art, the present disclosure particularly provides a detection method for low-quality fake face images based on domain-invariant feature learning in an innovative manner.

To realize the above objective of the present disclosure, the present disclosure provides a detection method for low-quality fake face images based on domain-invariant feature learning, including the following steps:

S1, inputting a high-quality dataset and a low-quality dataset into a residual network (ResNet)-50, forward propagating low-quality compressed input images and original images corresponding thereto through the ResNet-50, and extracting corresponding truncated feature maps $X_i$ from a Stage i of the ResNet-50, $X_i$ including truncated feature maps of the two datasets;

the low-quality dataset being a highly compressed dataset, and the high-quality dataset being an original uncompressed dataset;

S2, performing wavelet decomposition on outputs from the ResNet-50 at various stages to obtain high-frequency information of the two datasets of different resolutions; and using the obtained high-frequency information to compensate for features discarded in the compression process; and S3, performing T-distributed stochastic neighbor embedding (T-SNE) operation on outputs from the ResNet-50 at a final stage to obtain feature distributions of the high-quality dataset and the low-quality dataset to determine fake face images and real images.

By means of the high-frequency invariant feature learning in step S2, artifact traces in low-quality compressed images can be effectively retrieved; and by means of the high-dimensional feature distribution learning in step S3, the network can be guided to learn more distribution-consistent features.

Further, a formula for the wavelet decomposition performed is as follow:

$$H_{\overline{X}_i}(c, a, b) = \Im(\overline{X}_i(c, w, h)), i = 1, 2, 3, 4 \quad (2)$$

where $H_{\overline{X}_i}(c, a, b)$ represents high-frequency information, including horizontal high-frequency information $H_{\overline{X}_i}(c, a, b)_H$, vertical high-frequency information $H_{\overline{X}_i}(c, a, b)_V$ and diagonal high-frequency information $H_{\overline{X}_i}(c, a, b)_D$;

$\Im(\cdot)$ represents wavelet transform;

$\overline{X}_i$ is $\tilde{X}_i$ or $\hat{X}_i$, $\tilde{X}_i$ and $\hat{X}_i$ representing the truncated feature maps of the high-quality dataset and the low-quality dataset, respectively; and (c, w, h) represents a pixel point located in a channel of c, and having a width of w and a height of h;

a and b being ½ of w and h.

Further, by using the obtained high-frequency information to compensate for the features discarded in the compression process, feature maps are obtained, which are calculated by the following specific formula:

$$\mathcal{D}_i^j(c, a, b) = \sum_{c,a,b}^{C,A,B} d\left(H_{\hat{X}_i}(c, a, b)_j, H_{\tilde{X}_i}(c, a, b)_j\right), j \in \{H, V, D\}$$

where i represents the Stage i of the ResNet-50, i.e., outputs from the ResNet-50 at an $i_{th}$ stage;

j represents a j direction of the Stage i;

H, V, D represents horizontal, vertical and diagonal directions, respectively;

$d(H_{\hat{X}_i}(c, a, b)_j, H_{\tilde{X}_i}(c, a, b)_j)$ represents a distance between $H_{\hat{X}_i}(c, a, b)_j$ and $H_{\tilde{X}_i}(c, a, b)_j$, $H_{\hat{X}_i}(c, a, b)_j$ representing high-frequency information of a Stage i of the high-quality dataset in a j direction, $H_{\tilde{X}_i}(c, a, b)_j$ representing high-frequency information of a Stage i of the low-quality dataset in a j direction, and c, a, b representing position coordinates of a pixel point; and C represents the number of channels, A represents a width, and B represents a height.

Further, calculating a loss of high-frequency feature extraction is included:

$$L_{hf} = \sum_{i=1}^{4} \sum_{j \in \{H, V, D\}} \delta \cdot \eta \cdot \omega(a, b) \cdot \mathcal{D}_i^j(c, a, b) \quad (5)$$

where $\delta$ and $\eta$ represent vector weight parameters at different angles and scales;

$\omega(a, b)$ represents an attention weight;

$\mathcal{D}_i^j(c, a, b)$ represents a difference matrix of the Stage i in a j direction; and H, V, D represents horizontal, vertical and diagonal directions, respectively;

the attention weight $\omega(a, b)$ using cross-channel difference indices of four adjacent pixel points as weights, which ensures that a model pays more attention to high-frequency losses:

$$\omega(a, b) = \exp\left(\gamma_{hf} \cdot \frac{1}{c} \sum_{c=1}^{c} d\left(H_{\hat{X}_i}, H_{\tilde{X}_i}\right)\right), i = 1, 2, 3, 4 \quad (4)$$

where $\gamma_{hf}$ represents an average of the four adjacent pixel points;

C represents the number of channels; and $d(H_{\hat{X}_i}, H_{\tilde{X}_i})$ represents a distance between $H_{\hat{X}_i}$ and $H_{\tilde{X}_i}$, $H_{\hat{X}_i}$ being $H_{\hat{X}_i}(c, a, b)_H$, and $H_{\tilde{X}_i}$ being $H_{\tilde{X}_i}(c, a, b)_H$.

An end-to-end manner is used for training, which enables the network to learn more high-frequency domain-invariant features for low-quality fake face detection by minimizing training errors of the high-quality dataset and the low-quality dataset via $L_{hf}$.

Further, the following steps are included:

S3-1, calculating a Sigmoid function for each channel after feature maps of the high-quality dataset and feature maps of the low-quality dataset outputted from the ResNet-50 at the final stage undergo global average pooling and a fully-connected layer in sequence, to obtain a Sigmoid value of each convolutional channel;

S3-2, performing T-SNE calculation on the obtained Sigmoid value to obtain a feature map distribution $P_{raw}$ of the high-quality dataset and a feature map distribution $P_{c40}$ of the low-quality dataset; and S3-3, solving for Kullback-Leibler (KL) divergence of $P_{raw}$ and $P_{c40}$, and using the KL divergence to constrain the similarity between the distributions of the high-quality dataset and the low-quality dataset. Therefore, the network can learn more distribution-consistent information that can be used for inscribing correct artifact traces and removing noise information during training.

Further, the using KL divergence to constrain the similarity between the distributions of the high-quality dataset and the low-quality dataset is defined as follows:

$$L_{hd} = D_{KL}(P_{raw}, P_{c40}) = \sum_{i=1}^{n} P_{raw}(x_i) \log \frac{P_{raw}(x_i)}{P_{c40}(x_i)} \quad (8)$$

where $L_{hd}$ represents a distribution learning loss;

$D_{KL}(P_{raw}, P_{c40})$ represents solving for KL divergence of $P_{raw}$ and $P_{c40}$;

$P_{raw}(x_i)$ represents a distribution of $i_{th}$ data in the high-quality dataset;

$P_{c40}(x_i)$ represents a distribution of $i_{th}$ data in the low-quality dataset; and n represents a length of data in one batch.

Further, the method is realized on the basis of a fake face image detection system, the system including:

an ResNet-50, configured to extract multi-scale features from images;

a high-frequency invariant feature learning model (hf-IFLM), configured to efficiently retrieve artifact traces in low-quality compressed images; and a high-dimensional feature distribution learning model (hd-FDLM), configured to guide a network to learn more distribution-consistent features;

outputs from the ResNet-50 at various stages being inputs of the hf-IFLM, and outputs of the ResNet-50 at a final stage being inputs of the hd-FDLM. The whole framework utilizes common features in the distribution information of different data streams.

Further, a loss function of the system is a distribution loss:

$$\text{Loss} = L_{cls} + L_{hf} + L_{hd}$$

where $L_{cls}$ is a binary cross entropy loss (BCELoss), and is calculated by the following specific formula:

$$L_{cls} = -(y \log p(x) + (1 - y)\log(1 - p(x)))$$

where p(x) represents a model output, and y represents a real label;

$$L_{hd} = D_{KL}(P_{raw}, P_{c40}) = \sum_{i=1}^{n} P_{raw}(x_i) \log \frac{P_{raw}(x_i)}{P_{c40}(x_i)} \quad (8)$$

where $L_{hd}$ represents a distribution learning loss;

$D_{KL}(P_{raw}, P_{c40})$ represents solving for KL divergence of $P_{raw}$ and $P_{c40}$;

$P_{raw}(x_i)$ represents a distribution of $i_{th}$ data in a high-quality dataset;

$P_{c40}(x_i)$ represents a distribution of $i_{th}$ data in a low-quality dataset; and n represents a length of data in one batch;

$$L_{hf} = \sum_{i=1}^{4} \mathcal{D}_i = \sum_{i=1}^{4} \sum_{j \in \{H, V, D\}} \delta \cdot \eta \cdot \omega(a, b) \cdot \mathcal{D}_i^j(c, a, b) \quad (5)$$

where $\delta$ and $\eta$ represent vector weight parameters at different angles and scales;

$\omega(a, b)$ represents an attention weight;

$\mathcal{D}_i^j(c, a, b)$ represents a difference matrix of a Stage i in a j direction; and H, V, D represents horizontal, vertical and diagonal directions, respectively.

The entire network is trained in an end-to-end manner to jointly minimize the classification loss $L_{cls}$, the high-frequency loss $L_{hf}$, and the distribution learning loss $L_{hd}$. The two modules, hf-IFLM and hd-FDLM, synergistically complement the domain-invariant features by minimizing training errors of an original data stream and a low-quality data stream, enabling the network to learn more and more adequate fake traces and enabling the network to learn more correct artifacts to improve the fake face detection.

In summary, the present disclosure has the following advantages by adopting the above technical solutions.

(1) In this paper, domain invariance is used for the first time to inscribe correct artificial artifact traces, alleviating the overfitting on low-quality compressed images.

(2) Two modules, hf-IFLM and hd-FDLM, are proposed to learn domain-invariant feature representations, corresponding to high-frequency invariant feature learning in the middle layer and high-dimensional feature distribution learning in the output layer, respectively.

(3) In contrast to the commonly used frequency domain analysis, the present disclosure takes advantage of both spatial and frequency information by the use of haar wavelet transform, and enables the network to learn about domain-invariant feature representations more adequately by designing a multi-scale and multi-angle learning module.

Additional aspects and advantages of the present disclosure will be provided partially in the description below, where some will be apparent from the description below, or be understood through the practice of the present disclosure.

BRIEF DESCRIPTION OF THE DRAWINGS

The above and/or additional aspects and advantages of the present disclosure will become apparent and easily understood from the following description of embodiments by reference to the drawings accompanying below.

DETAILED DESCRIPTION

The embodiments of the present disclosure are described in detail below, examples of the embodiments are illustrated in the accompanying drawings, in which the same or similar elements or elements having the same or similar functions are denoted by the same or similar reference numerals throughout. The embodiments described below by reference to the accompanying drawings are exemplary, merely illustrative of the present disclosure, and are not to be deemed as limiting the scope of the present disclosure.

Analysis of a large number of comparative experiments reveals that the low-quality fake face detection is prone to overfitting, which results from the fact that minimizing the training error causes a model to learn all the correlations in training data regardless of consequences. However, low-quality images blur the boundary between real and fake artifacts, making the model more susceptible to representative bias and confounding factors, which results in the fact that the model fails to learn correct causality adequately while learning spurious correlations, i.e., non-artifacts.

To address these issues, it is proposed in the present disclosure to use domain-invariant features to generalize correct causality, mitigate the model's over-reliance on data bias, alleviate the overfitting, and improve the detection of fake faces on low-quality datasets.

1. Related Work 1.1 Fake Face Detection

Nowadays, due to the fake face detection being related to the protection of personal privacy, the research in this direction has attracted great attention. So far, many fake face detection methods have been proposed in academia and industry, contributing significantly to the research in this direction. For example, there is paper that proposes to determine real and fake images on the basis of the shape of pupils, and the pupils of a person are typically elliptical, whereas it is found that the shape of pupils on faces generated using generative techniques such as a generative adversarial network (GAN) is irregular. In addition, there is adoption of blinking frequency for fake face detection. However, these methods require the extraction of hand-crafted features, which is not only time-consuming but also very challenging. With the development of deep learning, researchers in fake face detection begin to turn to deep learning methods, aiming at more flexible and reliable detection through dynamic feature learning.

For example, Shreyan Ganguly. proposed a Vision Transformer with Xception Network (ViXNet), by which the consistencies of the almost imperceptible artifacts left by the deep faking method across the entire facial region is learned. Nevertheless, the consistencies are not sufficient for low-quality images and do not have a high practical value. To solve this problem, various additional information is used to improve performance, most of which, such as red-green-blue (RGB) and hue-saturation-value (HSV), are based on spatial domains. For example, some methods take advantage of specific artifacts generated during the synthesis, such as color or shape cues. G Wang. proposed a framework, multimodal contrast classification local correlation representation (MC-LCR), for effective fake face detection, and instead of specific appearance features, MC-LCR amplifies the implicit local difference between real and fake faces from both spatial and frequency domains. On the basis of the complementarity of amplitude and phase information, a patched amplitude and phase dual attention module is developed to capture inconsistencies of local correlation in the frequency domain, but the effectiveness of the inconsistencies is limited to datasets for specifically training. To be more flexible, in the present disclosure, domain-invariant features are learned to generalize correct causality, and less learning for spurious artifacts by network is carried out to improve the detection accuracy of low-quality images.

2.2 Domain Generalization

The training of conventional machine learning models is based on the assumption of independent identically distribution, i.e., the training and test sets are completely independently distributed. However, this assumption does not always workable in reality. If the probability distributions of the training data and test data are not synchronized, the performance of the machine learning model tends to deteriorate due to the gap in the domain distribution; and collecting data from all possible domains to train machine learning models is expensive, if not impossible. Therefore, improving the generalization ability of machine learning models is important in both industrial and academic fields. The goal of domain generalization is to learn a model from one or several different but related domains, i.e., different training datasets, and the model can generalize well with minimal prediction error when classifying images from a test domain.

Most domain generalization methods belong to domain feature alignment schemes, where the core idea is to learn domain-invariant representations as a way to minimize the difference between source domains. In this work, the high-quality dataset and the low-quality dataset are regarded as two different domains due to the difference in resolution. The dataset includes a training dataset and a test dataset, and the training set is formed by images belonging to the domains of the low and high-quality datasets. The domain-invariant features are learned by minimizing invariant risk. The goal of representative learning can be expressed as Formula 1:

$$\min_{f,g} \mathbb{E}_{x,y} \ell(f(g(x)), y) + \lambda \ell_{reg} \quad (1)$$

where $\ell$ represents a learning function; $f$ represents a classifier function; $\ell_{eg}$ represents a regularization term; $\lambda$ represents a tradeoff parameter; $\mathbb{E}$ represents mathematical expectation; and $\ell(\cdot)$ represents a loss function.

1.3 Wavelet Transform

Wavelet transform is a new method of transform analysis, in which the signal is represented as the sum of a sine function and a cosine function in contrast to the Fourier transform. The main difference is that the wavelet transform is localized in both temporal and frequency domains, while the standard Fourier transform is localized only in the frequency domain. The wavelet transform mainly features the ability to fully highlight certain aspects of the problem through transform, the ability to the localization analysis of temporal and spatial frequencies, and the gradual multi-scale refinement of signal by means of telescopic translation operations.

Overall, the wavelet transform is a multi-scale, multi-resolution image decomposition that focuses on any details of an image and is known as a mathematical microscope. On the basis of the microscopic properties of the wavelet transform, the wavelet transform is used for focusing on fake details in an image in this paper.

2. Method

Figure 1:
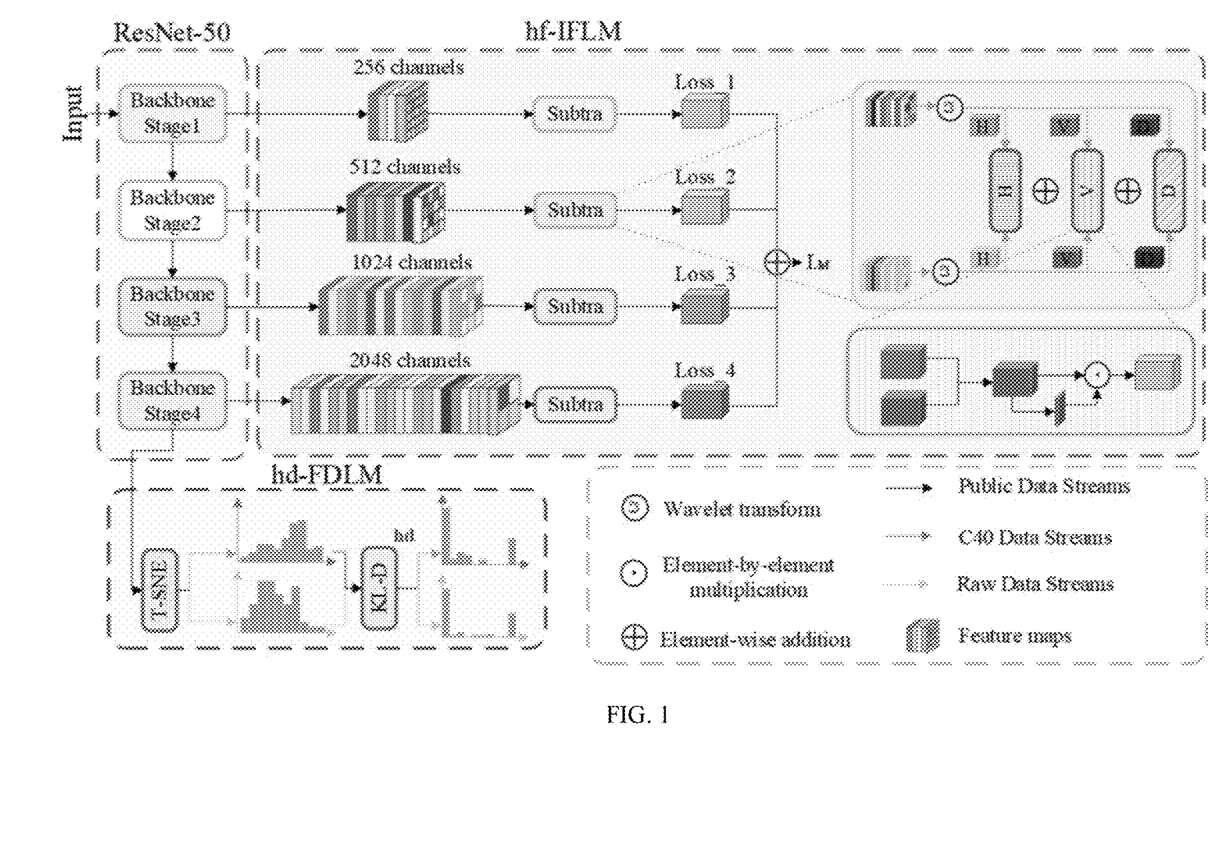
FIG. 1 is a schematic diagram of a framework structure of a deep learning-based classification model according to the present disclosure.

To improve the detection of low-quality fake face images, in the present disclosure, it is proposed a deep learning-based classification model, a domain-invariant feature learning detector (DIFLD), which can distinguish between fake face images produced by different deep faking techniques and real images. The framework structure of the model is shown in FIG. 1, which summarizes how the model works.

In the present disclosure, two synergistic modules, hf-IFLM and hd-FDLM are proposed from two different perspectives by learning domain-invariant features. First of all, the low-quality dataset and high-quality dataset mentioned in this paper are datasets in the false face dataset FF++, and highly compressed datasets and original uncompressed datasets. The datasets (corresponding frames of the low and high-quality data streams) are simultaneously put into a backbone network for feature learning. hf-IFLM extracts high-frequency domain-invariant features from Stages 1-4 of the backbone network, and hd-FDLM learns distribution-consistent information. The entire network structure is trained in an end-to-end manner by jointly minimizing the classification loss $L_{cls}$, the high-frequency loss $L_{hf}$, and the distribution learning loss $L_{hd}$.

From the perspective of learning more correct artificial traces, hf-IFLM is designed in the present disclosure. By forward propagating low-quality compressed input images and original images corresponding thereto through the backbone network, corresponding truncated feature maps $\tilde{X}_i(c, x, y) \in \mathbb{R}^{C \times W \times H}$ and $\hat{X}_i(c, x, y) \in \mathbb{R}^{C \times W \times H}$ are extracted from a Stage i of an ResNet-50. For convenience, a notation $X_i$ is used for representing a group of $\hat{X}_i(c, x, y)$ and $\tilde{X}_i(c, x, y)$. $X_i$ is transferred to a Subtra module, where multi-angle high-frequency information is used for compensating for features discarded from the low-quality images due to compression.

In hd-FDLM, two distributions of $P_{raw}$ and $P_{c40}$ are obtained by calculating the distribution ($\tilde{F}_{hd} = \hat{X}_4(c, x, y)$, $\tilde{F}_{hd} = \tilde{X}_4(c, x, y)$) of output layer feature maps $\tilde{F}_{hd}$ and $\tilde{F}_{hd}$ of the backbone network. The similarity between the low-quality dataset and the high-quality dataset is then constrained by the distribution distance loss $L_{hd}$. Therefore, the network can learn more distribution-consistent information that can be used for inscribing the correct artifact traces and removing noise information during training.

By designing the loss function, features (Loss_1, Loss_2, Loss_3, Loss_4, and $F_{hd}$) are learned and extracted from different modules in an end-to-end manner, and the training process is jointly guided by $L_{cls}$, $L_{hf}$ and $L_{hd}$.

2.1 hf-IFLM

Figure 2:
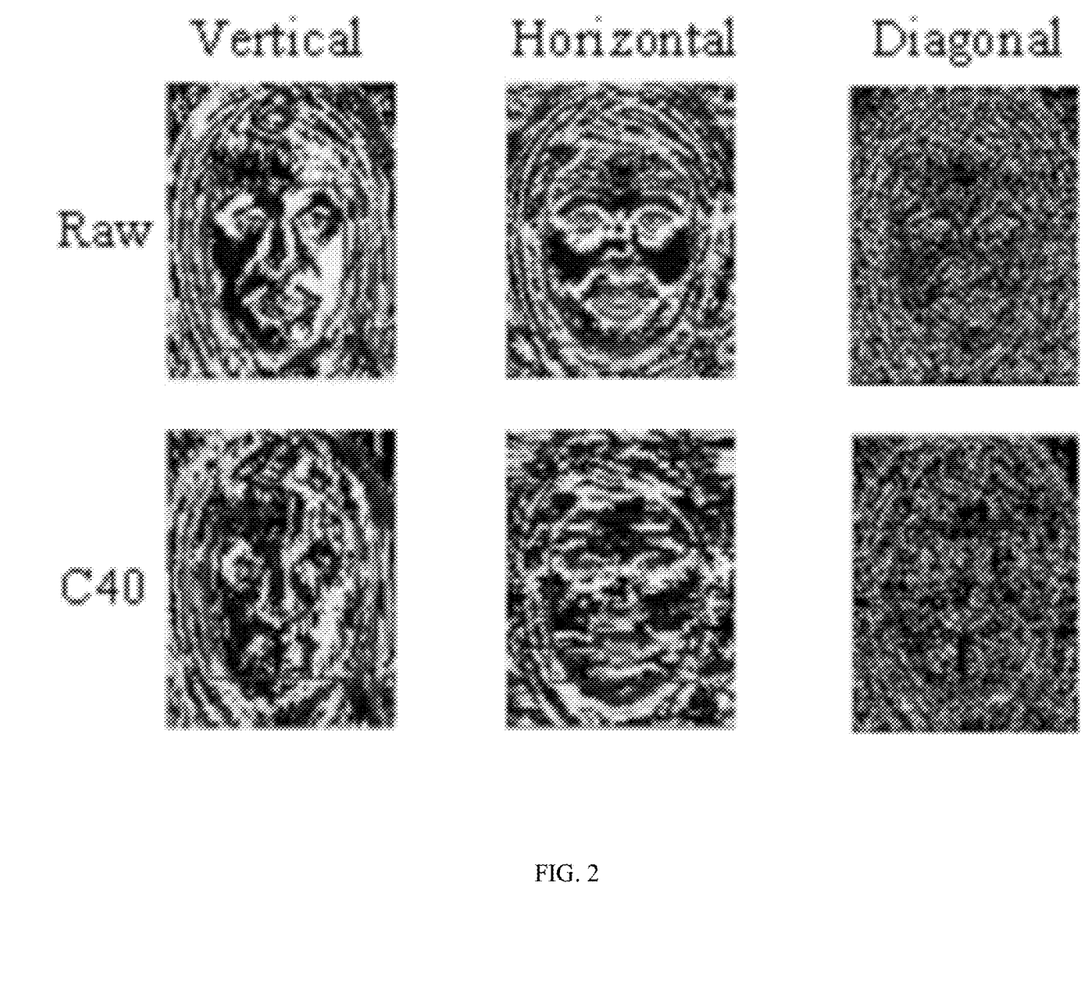
FIG. 2 is a high-frequency visualized schematic diagram of wavelet transform of fake images according to present disclosure.

As shown in FIG. 2, the synthesized facial region (red-framed region) and the background region show distinctly different distributions in high-frequency maps, and this suggests that the high-frequency information in the image can capture fake traces well. In addition, as shown in the last row of the low-quality image in FIG. 2, when the image is compressed, the artifact traces of the image generated using the Deepfake technique are blurred, which prevents the network from learning the artifact features. However, it is found from the top high-quality image that artificial artifact traces are clearly visible. Therefore, in the present disclosure, to compensate for the lack of low-quality images, an attempt is made to learn more artificial artifact traces from the high-frequency information of high-quality images.

It is well known that the shallow layers of deep neural networks tend to favor low-level features (e.g., colors and textures), while the deep layers tend to favor high-level abstract features. Therefore, in order to extract more adequate fake traces, high-frequency artificial trace extraction is performed on stages 1-4 of the backbone network. In addition, the high-frequency visualized diagram of the wavelet transform of the fake image in FIG. 2 includes high-frequency images in the horizontal, vertical, and diagonal directions for both the low-quality and high-quality datasets. It can be found in the present disclosure that the high-frequency information in horizontal, vertical and diagonal directions can capture artifacts well. Therefore, the information from all the three directions is simultaneously used for feature extraction. In summary, a feature extraction module for multi-scale and multi-angle high-frequency information, such as hf-IFLM in FIG. 1.

In order to convert spatial domain information into frequency domain information, outputs from the ResNet-50 at stages 1-4 are converted. In contrast to the conventional discrete Fourier transform, the work in the present disclosure uses the haar wavelet transform, in which, a trigonometric basis of infinite-length is replaced with a wavelet basis of finite length that will decay, enabling the network to capture not only frequency information but also temporal information.

Figure 3:
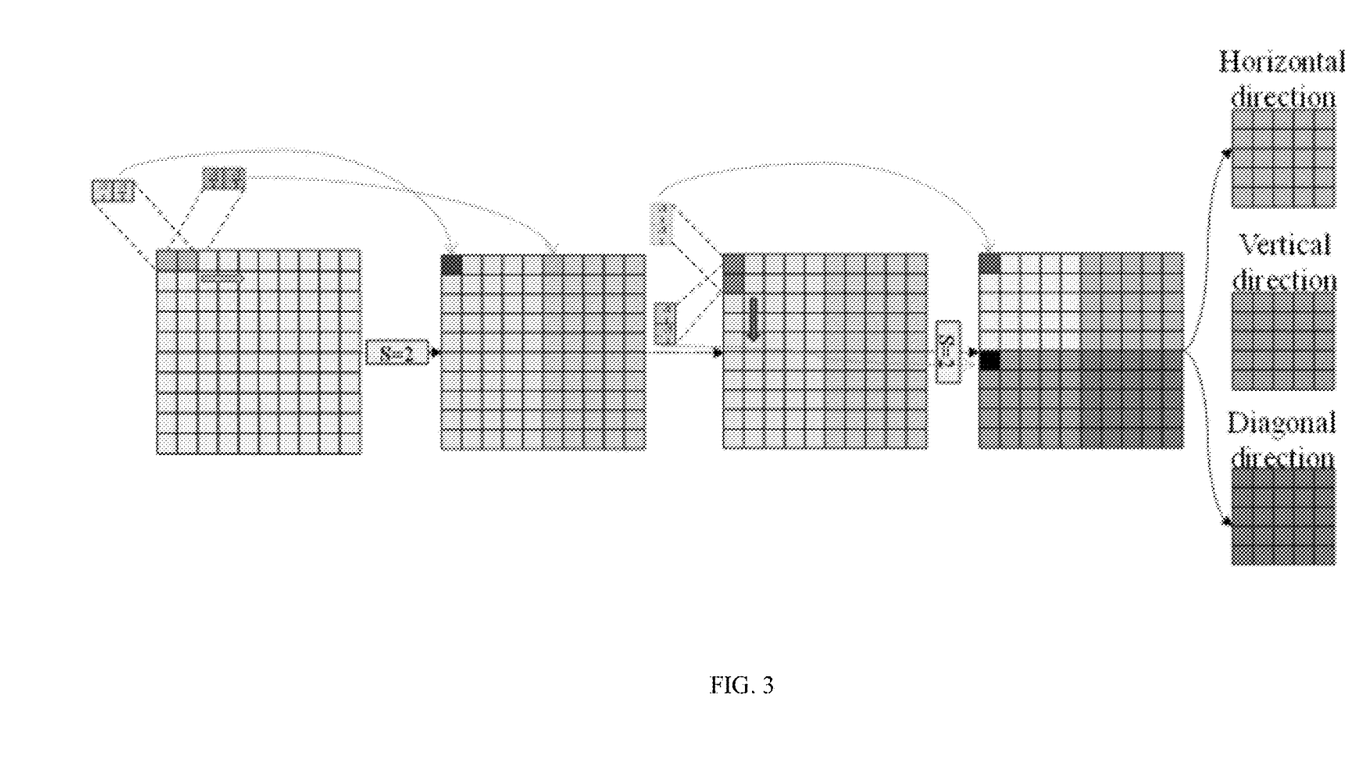
FIG. 3 is a schematic diagram of haar wavelet transform according to the present disclosure.

Design of hf-IFLM: first, the low-quality compressed input images and high-quality images corresponding thereto are propagated forward through the backbone network, the obtained features $\tilde{X}_i(c, w, h) \in \mathbb{R}^{C \times W \times H}$ represent the feature maps outputted from the low-quality dataset at the i layer of the backbone, and $\hat{X}_i(c, w, h) \in \mathbb{R}^{C \times W \times H}$ represents feature maps outputted from the high-quality dataset. Those datasets are located in a channel of C, and have a width of W and a height of H. These outputs from the backbone network are subjected to wavelet decomposition using the Formula (2) below. In FIG. 3, the diagram of the haar wavelet decomposition process of a two-dimensional image is visualized, and one-dimensional wavelet transform is separately performed on rows and columns.

$$H_{\bar{X}_i}(c, a, b) = \Im(\bar{X}_i(c, w, h)), i = 1, 2, 3, 4 \qquad (2)$$

where (c, w, h) represents a pixel point located in a channel of c, and having a width of w and a height of h;

$\Im(\cdot)$ represents wavelet transform;

$H_{\bar{X}_i}(c, a, b)$ represents high-frequency information, including horizontal high-frequency information $H_{\bar{X}_i}(c, a, b)_H$, vertical high-frequency information $H_{\bar{X}_i}(c, a, b)_V$ and diagonal high-frequency information $H_{\bar{X}_i}(c, a, b)_D$; and $\bar{X}_i$ is a value corresponding to $\tilde{X}_i$ or $\hat{X}_i$;

a and b being ½ of w and h.

High-frequency information of two datasets of different resolutions is obtained by wavelet decomposition, and is inputted into a Subtra module, and the multi-angle high-frequency information is used for compensating for features discarded in the compression process.

The Subtra module is formed by three differences of horizontal, vertical, and diagonal angles at two different resolutions.

In the Subtra module, the specific formula for the feature map is as follows:

$$\mathcal{D}_i^j(c, a, b) = \sum_{c,a,b}^{C,A,B} d(H_{\hat{X}_i}(c, a, b)_j, H_{\tilde{X}_i}(c, a, b)_j), j \in \{H, V, D\}$$

where i represents a Stage i of a backbone network, i.e., outputs from the ResNet-50 at an $i_{th}$ stage;

j represents a j direction of the Stage i;

H, V, D represents horizontal, vertical and diagonal directions, respectively; and $d(H_{\hat{X}_i}(c, a, b)_j, H_{\tilde{X}_i}(c, a, b)_j)$ represents a distance between $H_{\hat{X}_i}(c, a, b)_j$ and $H_{\tilde{X}_i}(c, a, b)_j$, $H_{\hat{X}_i}(c, a, b)_j$ representing high-frequency information of a Stage i of the high-quality dataset (Raw) in a j direction, and $H_{\tilde{X}_i}(c, a, b)_j$ representing high-frequency information of a Stage i of the low-quality dataset (C40) in a j direction.

Figure 4:
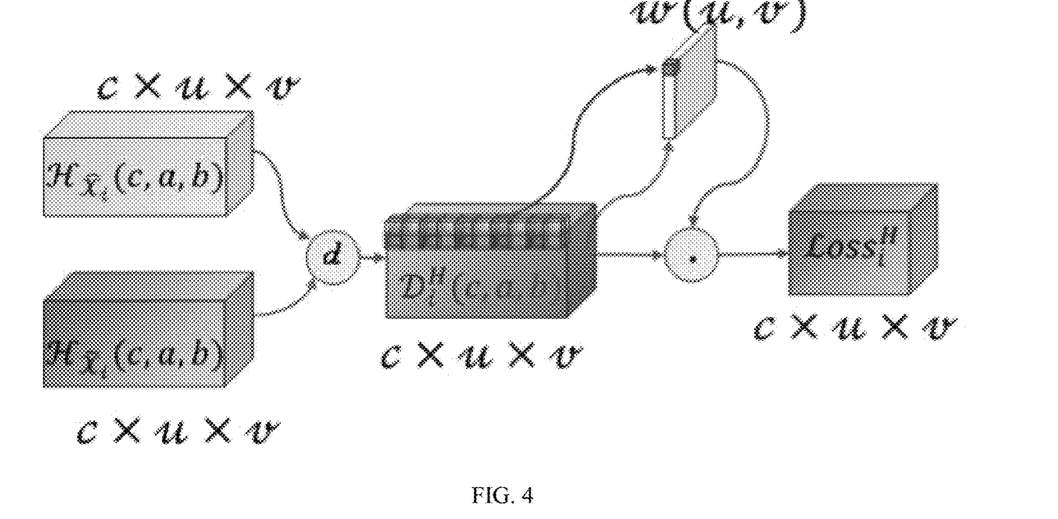
FIG. 4 is a visualized diagram of $Loss_i^H$ according to the present disclosure.

As shown in FIG. 4, a vertical direction of the Stage i, i=1, 2, 3, 4 is taken as an example, and it is assumed that the high-frequency difference can compensate for the loss of artifacts in the C40 dataset due to the compression of data. The specific calculation formula is as follows:

$$\mathcal{D}_i^H(c, a, b) = \sum_{c,a,b}^{C,A,B} d(H_{\hat{X}_i}(c, a, b)_H, H_{\tilde{X}_i}(c, a, b)_H) \qquad (3)$$

where $\mathcal{D}_i^H(c, a, b)$ represents a difference matrix of a Stage i in a vertical direction; and $d(H_{\hat{X}_i}(c, a, b)_H, H_{\tilde{X}_i}(c, a, b)_H)$ represents a distance between $H_{\hat{X}_i}(c, a, b)_H$ and $H_{\tilde{X}_i}(c, a, b)_H$, $H_{\hat{X}_i}(c, a, b)_H$ and $H_{\tilde{X}_i}(c, a, b)_H$ representing horizontal high-frequency information of the Stage i of the high-quality dataset (Raw) in the vertical direction and horizontal high-frequency information of the Stage i of the low-quality dataset (C40) in the vertical direction, respectively, and c, a, b representing position coordinates of a pixel point; and C, A, B represents sizes of the feature map.

To make the difference matrix $\mathcal{D}_i^H(c, a, b)$ work better, the attention weight $\omega(a, b)$ is designed using the property that humans recognize objects by naked eyes, i.e., the surrounding pixel points have an effect on the recognition of the current pixel point. Therefore, as calculated in Formula (4), the cross-channel difference indices of the four adjacent pixel points are used as weights.

$$\omega(a, b) = \exp\left(\gamma_{hf} \cdot \frac{1}{c}\sum_{c=1}^{c} d(H_{\hat{X}_i}, H_{\tilde{X}_i})\right), i = 1, 2, 3, 4 \qquad (4)$$

where $\gamma_{hf}$ represents an average of the four adjacent pixel points, and C represents a channel, and this design of the attention weight ensures that the model pays more attention to high-frequency losses;

C represents the number of channels; and $d(H_{\hat{X}_i}, H_{\tilde{X}_i})$ represents a distance between $H_{\hat{X}_i}$ and $H_{\tilde{X}_i}$, $H_{\hat{X}_i}$ being $H_{\hat{X}_i}(c, a, b)_H$, and $H_{\tilde{X}_i}$ being $H_{\tilde{X}_i}(c, a, b)_H$.

As a result, the feature maps in the three directions are obtained for element-wise addition to obtain the final feature map:

$$\mathcal{D}_i = \omega^H(a, b)\mathcal{D}_i^H(c, a, b) + \omega^V(a, b)\mathcal{D}_i^V(c, a, b) + \omega^D(a, b)\mathcal{D}_i^D(c, a, b)$$

where $\mathcal{D}$ represents a final feature map outputted at an $i_{th}$ stage, corresponding to LOSS_i in FIG. 1; and $\omega^H(a, b)$, $\omega^V(a, b)$ and $\omega^D(a, b)$ represent attention weights in three directions.

The feature maps in each direction are obtained by: calculating the difference between the high-quality data stream and the low-quality data stream by means of a distance indicator d, to obtain elemental differences in the corresponding weight coefficients for various channels, and then obtain attention maps (feature maps) by averaging the elemental differences for various channels.

Finally, this module proposes a domain-invariant feature learning method based on multi-scale and multi-angle. The losses of stages 1-4 in the several directions mentioned above are accumulated into Formula 5.

$$L_{hf} = \sum_{i=1}^{4} \mathcal{D}_i = \sum_{i=1}^{4} \sum_{j \in \{H,V,D\}} \delta \cdot \eta \cdot \omega(a, b) \cdot \mathcal{D}_i^j(c, a, b) \quad (5)$$

where $\delta$ and $\eta$ represent vector weight parameters at different angles and scales;

$\omega(a, b)$ represents an attention weight;

$\mathcal{D}_i^j(c, a, b)$ represents a difference matrix of a Stage i in a j direction; and H, V, D represents horizontal, vertical and diagonal directions, respectively.

The entire module is trained using an end-to-end manner. By minimizing the training errors of the high and low-quality datasets via $L_{hf}$, it enables the network to learn more high-frequency domain-invariant features for low-quality fake face detection.

3.2 hd-IFLM

Figure 5:
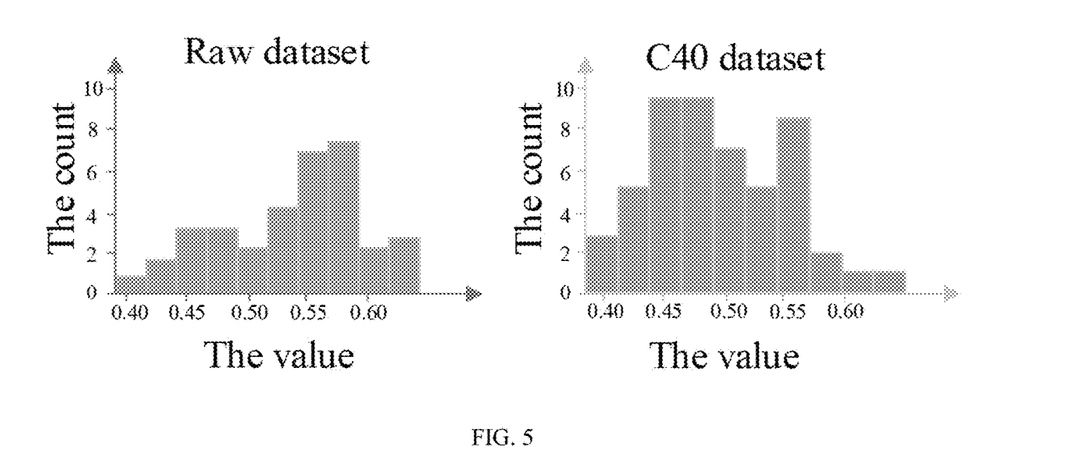
FIG. 5 is a schematic diagram showing distributions of Raw high-quality data and C40 low-quality data according to the present disclosure.

As shown in FIG. 5, it is found that there is a significant difference between the distributions of high and low-quality images. Therefore, two different feature distribution information are utilized to learn domain-invariant features, thus reducing the overlap between real and false artifacts in the low-quality distribution and enabling the model to learn the correct correlations.

To construct probability distributions for high and low-quality datasets, the feature distributions of high and low-quality datasets are represented using T-SNE. This is because the T-SNE algorithm not only can convert the data into a lower dimensional distribution that is easier to manipulate, but also preserve the local features of the data. The originally close data remains close after conversion, and the data that is far away remains far away after conversion.

Figure 6:
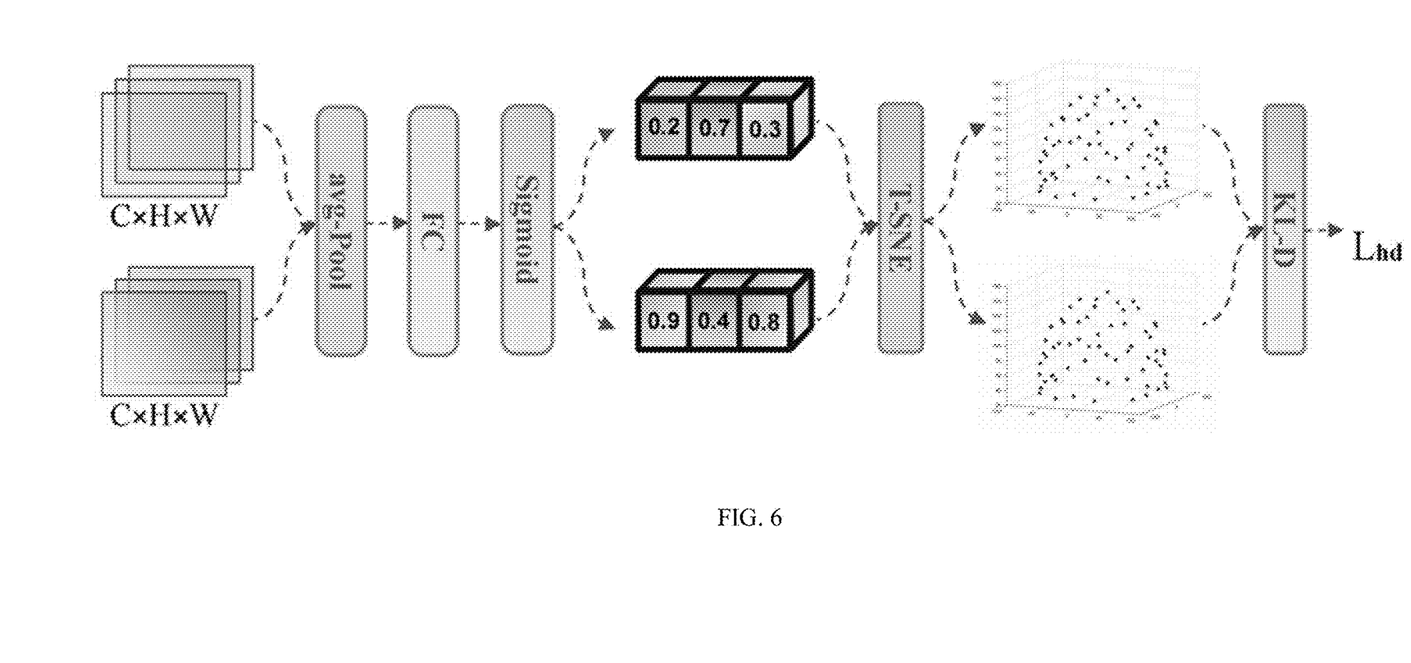
FIG. 6 shows an illustration of a module L_hd according to the present disclosure.

Design of hd-IFLM: high-dimensional features can extract artifact traces more subtly, which facilitates the detection in the present disclosure. As shown in FIG. 6, the low-quality compressed input images and high-quality images corresponding thereto are propagated forward through the backbone network, and accordingly, the features $\tilde{F}_{hd}$ and $\hat{F}_{hd}$ are obtained from the high-dimensional feature layer, i.e., the output layer stage 4 of the backbone network. A Sigmoid function for each channel is calculated after $\tilde{F}_{hd}$ and $\hat{F}_{hd}$ undergo global average pooling and a fully-connected layer, to obtain a Sigmoid value of each convolutional channel.

The obtained Sigmoid value is then subjected to T-SNE calculation, and the distribution is calculated by the T-SNE calculation as follows:

$$P(j|i) = \frac{s(x_i, x_j)}{\sum_{k \neq i} S(x_i, x_k)}, j \neq i, i = 1, 2, \ldots \quad (6)$$

where $x_i$, $x_j$ and $x_k$ represent three different points in a high-dimensional space; and $S(x_i, x_j)$ represents the similarity between data i and data j. The closer the distance between the two data, the more similar they are. In this paper, Euclidean distance is used for calculating the similarity between feature maps as shown in Formula (7). Assuming there are n pieces of data, n probability distributions will be defined for these data.

$$S(x_i, x_j) = \sqrt{(x_i - x_j)^2} \quad (7)$$

After obtaining the distributions of the two data streams, the distribution of the high-quality dataset is represented as $P_{raw}$ and the distribution of the low-quality dataset as $P_{c40}$. To narrow the performance gap between the low-quality dataset and high-quality dataset, the similarity distribution of low-quality samples is constrained to be close to that of high-quality samples. KL divergence is used for constraining the similarity between the distributions of the high-quality dataset and the low-quality dataset, which is defined as follows:

$$L_{hd} = D_{KL}(P_{raw}, P_{c40}) = \sum_{i=1}^{n} P_{raw}(x_i) \log \frac{P_{raw}(x_i)}{P_{c40}(x_i)} \quad (8)$$

where $L_{hd}$ represents a distribution learning loss;

$D_{KL}(P_{raw}, P_{c40})$ represents solving for KL divergence of $P_{raw}$ and $P_{c40}$;

$P_{raw}(x_i)$ represents a distribution of $i_{th}$ data in the high-quality dataset;

$P_{c40}(x_i)$ represents a distribution of $i_{th}$ data in the low-quality dataset; and n represents a length of data in one batch.

Ultimately, the whole framework utilizes common features in the distribution information of different data streams. The method of the present disclosure contains a novel distribution loss that enables the network to learn more about the correct artifacts.

A final loss of the proposed deep learning-based classification model DIFLD of the present disclosure is as follows:

$$\text{Loss} = L_{cls} + L_{hf} + L_{hd}$$

where $L_{cls}$ is a BCELoss, and is calculated by the following specific formula:

$$L_{cls} = -(y \log p(x) + (1 - y)\log(1 - p(x)))$$

where p(x) represents a model output, and y represents a real label.

The entire network is trained in an end-to-end manner to jointly minimize the classification loss $L_{cls}$, the high-frequency loss $L_{hf}$, and the distribution learning loss $L_{hd}$. The two modules, synergistically complement the domain-invariant features by minimizing the training errors of the original data stream and the low-quality data stream, enabling the network to learn more and more adequate fake traces and enabling the network to learn more correct artifacts to improve fake face detection.

3. Experiment

3.1 Experiment Setting

Dataset: following the previous fake face detection methods, experiments are conducted on the challenging FF++ dataset released in 2019. It is a large-scale forensic dataset that includes 1000 real face videos from 977 YouTube videos and 4000 fake face videos obtained by four face manipulation techniques: DeepFakes, Face2Face, FaceSwap and NeuralTextures (NT). It is worth noting that artificial intelligence (AI)-synthesized videos distributed on social networks are usually compressed. Therefore, these raw videos are compressed into two low-quality versions to simulate real forensic scenarios, and are moderately compressed and highly compressed using an H.264 codec with quantization parameters of 23, and 40, respectively at a constant rate. Since the benchmark test achieves almost perfect detection performance in the high-quality version, the method of the present disclosure mainly uses the low-quality compressed version of the two compressed versions.

Fifteen mutually exclusive datasets containing 1000 videos each are constructed. Following the FF++ partitioning method, each dataset is divided into training, validation and test datasets containing 720, 140 and 140 videos, respectively. For all videos, facial regions are cropped by the officially given masks, instead of using multi-task cascaded convolutional networks (MTCNN), which may crop non-artificial regions. Then, aligned facial images with a pixel of 128×128 are taken as inputs. By sampling each video at an interval of 30 frames, 15 datasets containing 30000 images are obtained.

Implementation and hyper-parameters: in the experiments, a PyTorch framework is used to implement the method of the present disclosure with ResNet50 as the backbone. An Adam optimizer is used with $\beta_1=0.9$, $\beta_2=0.999$, and $\epsilon=10^{-8}$. The learning rate is initialized to $1\times10^{-4}$, and the weight decays to $1\times10^{-8}$. In the training stage, the size of a batch is set to 48. In each epoch, the model is validated 10 times to preserve the best parameters using the validation accuracy. Early stopping is applied when there is no improvement in validation performance after 10 consecutive validations. The weight parameter of a high-dimensional feature distribution learning module is 1, the weight parameter of a high-frequency invariant feature learning module is 16, and the weight parameter of a BCEloss is 1. In the following experiments, accuracy (%) is taken as an evaluation indicator, and the model of the present disclosure is trained on an RTX 3070 GPU.

3.2 Performance Detection

The difference between fake face datasets is mainly due to the difference between manipulation methods of source videos and faces. To evaluate the cross-manipulation generalization ability of different fake face detectors and to prevent possible biases introduced by different source videos, experiments are conducted on FF++ as it provides fake videos created by multiple face faking methods for the same source video.

The method of the present disclosure is compared with the current state-of-the-art fake face detection method. As shown in Table 1, for the FF++ dataset, the method of the present disclosure achieves a significant improvement in different quality settings, and especially in the challenging low-quality setting, the accuracy (ACC) score of the method of the present disclosure exceeds by 13.48% compared to an attribute driven design (ADD)-ResNet50. An explanation is made as follows. Domain-invariant features are used to inscribe correct artifacts, and those features are further learned by the network through high-dimensional distribution-invariant feature learning; and the multi-scale and multi-angle design enables the network to learn more artifact traces, and improves the low-quality fake face detection. In addition, it can be found that the method of the present disclosure has more obvious effect on those more challenging datasets, such as Face2Face and NT datasets. Since the network of the present disclosure learns invariant features in Raw and low-quality data in an end-to-end manner in real-time, this enables the network to learn artifacts in a safe manner and outperforms previous networks that learn features through obvious artifact traces, thus proving the effectiveness of the method proposed in the present disclosure.

For a more accurate analysis, the accuracy of real and fake images is broadly analyzed separately. From the baseline, it can be clearly found that the model is usually less accurate for real images than for fake ones, suggesting to some extent that the detection effect can be improved by increasing the recognition rate of real images, which the model of the present disclosure does, as shown in Table 2. Again, it is shown how well the model of the present disclosure can capture traces of invariant artifacts common to both data streams and enable more accurate classification. As can be seen from Table 3, the method proposed in this paper outperforms the baseline in terms of both ACC and area under curve (AUC).

| Methods | Low-quality dataset | | | | High-quality dataset | | | |
|---|---|---|---|---|---|---|---|---|
| | DeepFake | Face2Face | FaceSwap | NT | DeepFake | Face2Face | FaceSwap | NT |
| Rössler et al | 92.43 | 80.21 | 88.09 | 56.75 | 97.42 | 91.83 | 95.49 | 76.36 |
| Dogonadze et al. [ | 93.97 | 83.44 | 90.02 | 61.12 | 94.67 | 89.34 | 93.33 | 78.03 |
| F$^3$ Net | 93.06 | 81.48 | 89.58 | 61.95 | 96.26 | 95.52 | 95.74 | 77.91 |
| ResNet50 | 92.89 | 83.94 | 88.91 | 60.27 | 96.34 | 95.60 | 92.46 | 86.25 |
| FitNet-ResNet50 | 93.68 | 83.48 | 89.16 | 66.01 | 97.28 | 95.91 | 97.29 | 86.26 |
| AT - ResNet50 | 95.11 | 83.55 | 89.75 | 62.61 | 97.37 | 96.80 | 97.66 | 85.21 |
| NL - ResNet50 | 93.09 | 83.69 | 91.86 | 65.65 | 98.42 | 96.44 | 97.34 | 88.26 |

-continued

|  | Low-quality dataset | | | | High-quality dataset | | | |
| --- | --- | --- | --- | --- | --- | --- | --- | --- |
| Methods | DeepFake | Face2Face | FaceSwap | NT | DeepFake | Face2Face | FaceSwap | NT |
| ADD-ResNet50 | 95.50 | 85.42 | 92.49 | 68.53 | 98.67 | 96.82 | 97.85 | 88.48 |
| ResNet50 + Face-Cutout | 95.86 | 89.14 | 93.02 | 78.34 | 98.90 | 97.08 | 97.89 | 91.15 |
| MCX-API | 95.71 | 87.12 | 92.83 | 78.79 | 98.73 | 96.98 | 97.91 | 89.96 |

TABLE 2

Accuracy of the model of the present disclosure and baseline (ADD-ResNet50) model on FF++ regarding real and fake images

|  |  | C23 | | C40 | |
| --- | --- | --- | --- | --- | --- |
| Datasets | Models | Real | Fake | Real | Fake |
| DeepFakes | Baseline | 93.98 | 95.93 | 89.34 | 94.56 |
|  | Model of the present disclosure | 96.38 | 99.26 | 96.85 | 94.06 |
| Face2Face | Baseline | 90.88 | 95.02 | 87.26 | 88.68 |
|  | Model of the present disclosure | 98.05 | 95.07 | 94.66 | 84.94 |
| FaceSwap | Baseline | 96.94 | 87.92 | 89.09 | 84.35 |
|  | Model of the present disclosure | 98.43 | 94.56 | 96.58 | 84.72 |
| NT | Baseline | 83.84 | 89.33 | 84.41 | 68.21 |
|  | Model of the present disclosure | 94.87 | 89.04 | 81.47 | 75.16 |
| ALL | Baseline | 93.98 | 95.93 | 89.34 | 94.56 |
|  | Model of the present disclosure | 90.13 | 95.96 | 90.12 | 94.84 |

TABLE 3

Classification ACC (%) and AUC (%) for the method of the present disclosure and baseline method

|  |  | C23 | | C40 | |
| --- | --- | --- | --- | --- | --- |
| Datasets | Models | ACC | AUC | ACC | AUC |
| DeepFakes | Baseline | 94.96 | 98.63 | 91.90 | 97.53 |
|  | Method of the present disclosure | 97.82 | 99.84 | 95.47 | 99.23 |
| Face2Face | Baseline | 92.72 | 97.80 | 87.91 | 94.89 |
|  | Method of the present disclosure | 96.74 | 98.67 | 90.25 | 96.08 |
| FaceSwap | Baseline | 92.89 | 97.40 | 86.95 | 93.68 |
|  | Method of the present disclosure | 96.70 | 99.20 | 91.30 | 96.73 |
| NT | Baseline | 86.35 | 94.26 | 77.17 | 85.39 |
|  | Method of the present disclosure | 92.26 | 96.72 | 78.65 | 87.04 |
| ALL | Baseline | 87.62 | 93.31 | 83.69 | 88.01 |
|  | Method of the present disclosure | 93.00 | 97.57 | 84.95 | 89.40 |

The best results among all methods are shown in bold. To illustrate the superiority of the method proposed in the present disclosure, the T-SNE feature space of different data in the FF++ low-quality dataset is visualized to explore the impact of components of the present disclosure on the learning of distributed representations. It can be observed from FIG. 7 that the features extracted from ADD-ResNet50 are compactly clustered in the T-SNE embedding space, which restricts the distinction between fake faces and real faces. The red color represents original real images, and the rest of the colors represent the data generated by different manipulation methods.

Figure 7:
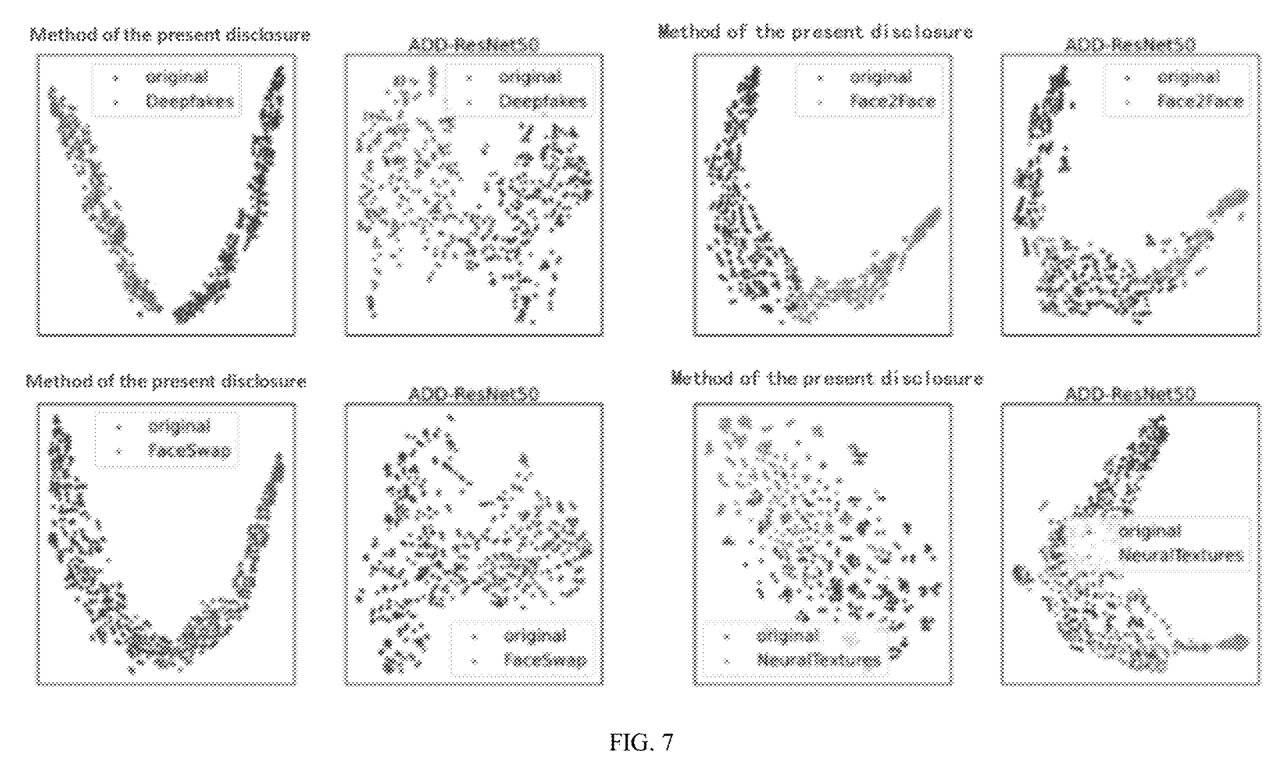
FIG. 7 is a visualized schematic diagram of performing T-SNE on a FaceForensics (FF)++C40 dataset using a baseline method and a method proposed in the present disclosure.

In particular, the features of fake faces of NT and Face2Face and real faces are compressed together, as this method only performs small-scale manipulations. The distribution of the learned fusion representations changes after the inclusion of domain-invariant features extracted from high and low-quality domains by hf-IFLM and hd-FDLM. More manipulated faces tend to be farther away from real faces and other categories, with representations of the same category being pulled together while the distance between categories increased significantly. These distributional changes suggest that the common invariant artifacts captured by the method of the present disclosure in different domains help to distinguish between fake and real faces.

Figure 8:
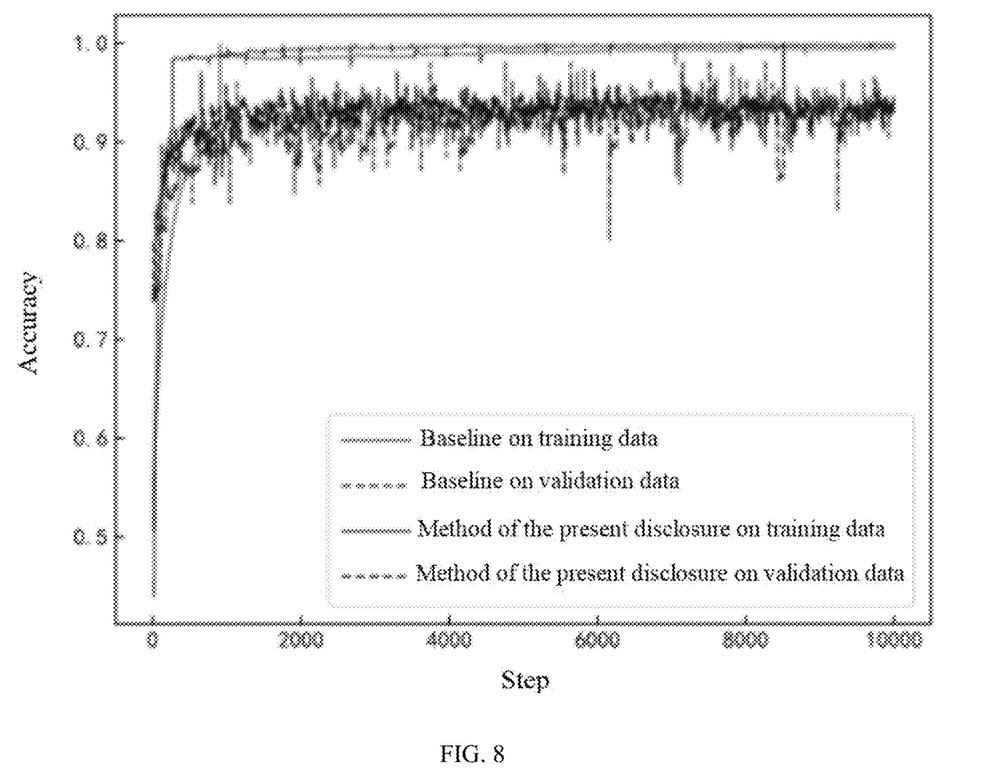
FIG. 8 shows an accuracy comparison between the baseline method and the method proposed in the present disclosure.

The classification accuracy on FF++ by the method of the present disclosure and by the baseline is visualized. As shown in FIG. 8, the method of DIFLD proposed in the present disclosure outperforms the ADD-ResNet50 model of the baseline overall.

3.3 Ablation Experiment and Discussion

The feasibility of the two modules proposed in this paper is investigated and the results are presented in Table 4.

TABLE 4

Impact of two modules on low-quality NT dataset

| Method | ACC (%) |
| --- | --- |
| ADD-ResNet50 | 68.53 |
| W/o hf-IFLM module | 81.16 |
| W/o hd-FDLM module | 80.56 |
| Method of the present disclosure | 82.01 |

In the past, it was proved that the NT dataset was the most difficult to be distinguished by human eyes and deep neural networks. Therefore, an ablation study on low-quality and high-quality NT datasets is performed. It can be observed that hf-IFLM and hd-FDLM improve the accuracy by about 12.03% and 12.63%, respectively. Finally, hf-IFLM and hd-FDLM are combined to significantly improve the accuracy by 82.01%. Ablation results show that various proposed modules contribute differently to the framework's ability to learn domain-invariant features from high-quality and low-quality datasets, and are compatible when they are integrated together for optimal performance.

In summary, by using domain-invariant features to inscribe correct causality, the present disclosure proposes a new deep fake face detection algorithm that improves robustness of the low-quality images. Specifically, firstly, the distributional invariant property is utilized to extract domain knowledge and a distributional invariant feature extraction module is designed to extract AI. Then, a high-frequency enhancement module is proposed to enhance the detection on low-quality images by utilizing high-frequency information from the high-quality dataset. Experimental results on the FF++ dataset, especially on the low-quality compressed dataset, show that the algorithm outperforms other state-of-the-art algorithms.

DIFLD ensures the comprehensiveness of the model when detecting artifacts, thus increasing the detection capability, but reducing the generalization capability to some extent. Therefore, improving generalization ability is an issue to be considered in the future. In addition, since all state-of-the-art algorithms including the one proposed in this paper focus on plain text deepfake video detection, an attempt to detect encrypted deepfake videos to protect privacy is made.

Although the embodiments of the present disclosure have been showed and described, for those ordinary skilled in the art, it can be understood as various changes, modifications, replacements and variations can be made on these embodiments within the principle and spirit of the present disclosure. The scope of the present disclosure is defined by the claims and the equivalent thereof.

The invention claimed is:

1. A detection method for low-quality fake face images based on domain-invariant feature learning, comprising the following steps:
S1, inputting a high-quality dataset and a low-quality dataset into a residual network (ResNet)-50, forward propagating low-quality compressed input images and original images corresponding thereto through the ResNet-50, and extracting corresponding truncated feature maps $X_i$ from a Stage i of the ResNet-50, $X_i$ comprising truncated feature maps of the two datasets,
the low-quality dataset being a highly compressed dataset, and the high-quality dataset being an original uncompressed dataset;
S2, performing wavelet decomposition on outputs from the ResNet-50 at various stages to obtain high-frequency information of the two datasets of different resolutions; and using the obtained high-frequency information to compensate for features discarded in the compression process;
a formula for the wavelet decomposition performed being as follows:

$$H_{\bar{X}_i}(c, a, b) = \Im(\bar{X}_i(c, w, h)), i = 1,2,3,4 \quad (2)$$

where $H_{\bar{X}i}(c, a, b)$ represents high-frequency information, comprising horizontal high-frequency information $H_{\bar{X}i}(c, a, b)_H$, vertical high-frequency information $H_{\bar{X}i}(c, a, b)_V$ and diagonal high-frequency information $H_{\bar{X}i}(c, a, b)_D$;
$\Im(\cdot)$ represents wavelet transform;
$\bar{X}_i$ is $\tilde{X}_i$ or $\hat{X}_i$, $\tilde{X}_i$ and $\hat{X}_i$ representing the truncated feature maps of the high-quality dataset and the low-quality dataset, respectively; and
(c, w, h) represents a pixel point located in a channel of c, and having a width of w and a height of h;
a and b are ½ of w and h, respectively; and
by using the obtained high-frequency information to compensate for the features discarded in the compression process, feature maps being obtained, which are calculated by the following specific formula:

$$\mathcal{D}_i^j(c, a, b) = \sum_{c,a,b}^{C,A,B} d(H_{\hat{X}_i}(c, a, b)_j, H_{\tilde{X}_i}(c, a, b)_j), j \in \{H, V, D\}$$

where i represents the Stage i of the ResNet-50, i.e., outputs from ResNet-50 at an $i_{th}$ stage;
j represents a j direction of the Stage i;
H, V, D represents horizontal, vertical and diagonal directions, respectively;
$d(H_{\hat{X}i}(c, a, b)_j, H_{\tilde{X}i}(c, a, b)_j)$ represents a distance between $H_{\hat{X}i}(c, a, b)_j$ and $H_{\tilde{X}i}(c, a, b)_j$,
$H_{\hat{X}i}(c, a, b)_j$ representing high-frequency information of a Stage i of the high-quality dataset in a j direction,
$H_{\tilde{X}i}(c, a, b)_j$ representing high-frequency information of a Stage i of the low-quality dataset in a j direction, and
c, a, b representing position coordinates of a pixel point; and
C represents the number of channels, A represents a width, and B represents a height; and
S3, performing T-distributed stochastic neighbor embedding (T-SNE) operation on outputs from the ResNet-50 at a final stage to obtain feature distributions of the high-quality dataset and the low-quality dataset to determine fake face images and real images.

2. The detection method for low-quality fake face images based on domain-invariant feature learning according to claim 1, further comprising: calculating a loss for high-frequency feature extraction:

$$L_{hf} = \sum_{i=1}^{4} \sum_{j \in \{H,V,D\}} \delta \cdot \eta \cdot \omega(a, b) \cdot \mathcal{D}_i^j(c, a, b) \quad (5)$$

where $\delta$ and $\eta$ represent vector weight parameters at different angles and scales;
$\omega(a, b)$ represents an attention weight;
$\mathcal{D}_i^j(c, a, b)$ represents a difference matrix of a Stage i in a j direction; and
H, V, D represents horizontal, vertical and diagonal directions, respectively;
the attention weight $\omega(a, b)$ using cross-channel difference indices of four adjacent pixel points as weights:

$$\omega(a, b) = \exp\left(\gamma_{hf} \cdot \frac{1}{C} \sum_{c=1}^{C} d(H_{\hat{X}_i}, H_{\tilde{X}_i})\right), i = 1,2,3,4 \quad (4)$$

where $\gamma_{hf}$ represents an average of the four adjacent pixel points;
C represents the number of channels; and
$d(H_{\hat{X}i}, H_{\tilde{X}i})$ represents a distance between $H_{\hat{X}i}$ and $H_{\tilde{X}i}$, $H_{\hat{X}i}$ being $H_{\hat{X}i}(c, a, b)_H$, and $H_{\tilde{X}i}$ being $H_{\tilde{X}i}(c, a, b)_H$.

3. The detection method for low-quality fake face images based on domain-invariant feature learning according to claim 1, further comprising the following steps:
S3-1, calculating a Sigmoid function for each channel after feature maps of the high-quality dataset and feature maps of the low-quality dataset outputted from the ResNet-50 at the final stage undergo global average pooling and a fully-connected layer in sequence, to obtain a Sigmoid value of each convolutional channel;

S3-2, performing T-SNE calculation on the obtained Sigmoid value to obtain a feature map distribution $P_{raw}$ of the high-quality dataset and a feature map distribution $P_{c40}$ of the low-quality dataset; and S3-3, solving for Kullback-Leibler (KL) divergence of $P_{raw}$ and $P_{c40}$, and using the KL divergence to constrain the similarity between the distributions of the high-quality dataset and the low-quality dataset.

4. The detection method for low-quality fake face images based on domain-invariant feature learning according to claim 3, wherein the using the KL divergence to constrain the similarity between the distributions of the high-quality dataset and the low-quality dataset is defined as follows:

$$L_{hd} = D_{KL}(P_{raw}, P_{c40}) = \sum_{i=1}^{n} P_{raw}(x_i) \log \frac{P_{raw}(x_i)}{P_{c40}(x_i)} \quad (8)$$

where $L_{hd}$ represents a distribution learning loss;
$D_{KL}(P_{raw}, P_{c40})$ represents solving for KL divergence of $P_{raw}$ and $P_{c40}$;
$P_{raw}(x_i)$ represents a distribution of $i_{th}$ data in the high-quality dataset;
$P_{c40}(x_i)$ represents a distribution of $i_{th}$ data in the low-quality dataset; and
n represents a length of data in one batch.

5. The detection method for low-quality fake face images based on domain-invariant feature learning according to claim 1, wherein the method is realized on the basis of a fake face image detection system, the system comprising:

an ResNet-50, configured to extract multi-scale features from images;
a high-frequency invariant feature learning model (hf-IFLM), configured to efficiently retrieve artifact traces in low-quality compressed images; and
a high-dimensional feature distribution learning model (hd-FDLM), configured to guide a network to learn more distribution-consistent features;
outputs from the ResNet-50 at various stages being inputs of the hf-IFLM, and outputs from the ResNet-50 at a final stage being inputs of the hd-FDLM.

6. The detection method for low-quality fake face images based on domain-invariant feature learning according to claim 5, wherein a loss function of the system is a distribution loss:

$$\text{Loss} = L_{cls} + L_{hf} + L_{hd}$$

where $L_{cls}$ is a binary cross entropy loss (BCELoss), and is calculated by the following specific formula:

$$L_{cls} = -(y \log p(x) + (1-y) \log(1-p(x)))$$

where p(x) represents a model output, and y represents a real label;

$$L_{hd} = D_{KL}(P_{raw}, P_{c40}) = \sum_{i=1}^{n} P_{raw}(x_i) \log \frac{P_{raw}(x_i)}{P_{c40}(x_i)} \quad (8)$$

where $L_{hd}$ represents a distribution learning loss;
$D_{KL}(P_{raw}, P_{c40})$ represents solving for KL divergence of $P_{raw}$ and $P_{c40}$;
$P_{raw}(x_i)$ represents a distribution of $i_{th}$ data in a high-quality dataset;
$P_{c40}(x_i)$ represents a distribution of $i_{th}$ data in a low-quality dataset; and
n represents a length of data in one batch;

$$L_{hf} = \sum_{i=1}^{4} \sum_{j \in \{H,V,D\}} \delta \cdot \eta \cdot \omega(a,b) \cdot \mathcal{D}_i^j(c,a,b) \quad (5)$$

where $\delta$ and $\eta$ represent vector weight parameters at different angles and scales;
$\omega(a, b)$ represents an attention weight;
$\mathcal{D}_i^j(c, a, b)$ represents a difference matrix of a Stage i in a j direction; and
H, V, D represents horizontal, vertical and diagonal directions, respectively.

* * * * *